United States Patent [19]

Banda

[11] Patent Number: 5,214,278
[45] Date of Patent: May 25, 1993

[54] APPARATUS FOR MONITORING SPEED AND LATERAL POSITION OF A ROTATING SHAFT HAVING REFLECTIVE SURFACES

[75] Inventor: Lionel A. Banda, South Windsor, Conn.

[73] Assignee: Combustion Engineering, Inc., Windsor, Conn.

[21] Appl. No.: 786,870

[22] Filed: Nov. 1, 1991

[51] Int. Cl.⁵ .............................................. G01D 5/34
[52] U.S. Cl. .......................... 250/231.14; 250/231.13; 324/175
[58] Field of Search ...................... 250/231.13, 231.14, 250/231.18, 229; 356/400, 401, 375; 324/175

[56] References Cited

U.S. PATENT DOCUMENTS

| | | | |
|---|---|---|---|
| 4,103,155 | 7/1978 | Clark | 250/231.13 |
| 4,425,043 | 1/1984 | Rosemalen | 356/400 |
| 4,650,995 | 3/1987 | Tokunaga et al. | 250/231.13 |
| 4,987,299 | 1/1991 | Kobayashi et al. | 250/231.18 |
| 5,001,937 | 3/1991 | Bechtel et al. | 250/231.14 |

Primary Examiner—David C. Nelms
Assistant Examiner—Que T. Le
Attorney, Agent, or Firm—John H. Mulholland

[57] ABSTRACT

An apparatus for monitoring the position of the shaft of a coolant circulating pump of a nuclear steam generating system comprising light source for directing a light beam at a number of reflecting surfaces on the shaft and a pair of spaced apart light receiving devices adapted to receive light beams reflected off the reflecting surface. Light from the receiving devices is conveyed, by fiber optic cables, to intensity measuring devices which measure the intensity of the two light beams on a time-dependent basis. A processor calculates the shaft rotational speed and the magnitude of the shaft wobble as functions of the time-dependent intensity measurements of the pair of reflected light beams.

2 Claims, 2 Drawing Sheets

APPARATUS FOR MONITORING SPEED AND LATERAL POSITION OF A ROTATING SHAFT HAVING REFLECTIVE SURFACES

BACKGROUND AND SUMMARY OF THE INVENTION

The present invention pertains to an apparatus for monitoring the speed and lateral position variations of a rotating shaft of a coolant circulating pump for a nuclear steam supply system.

In a nuclear steam supply system, coolant is circulated through the reactor by means of one or more large, high speed reactor coolant pumps. Loss of reactor coolant has serious adverse consequences, including, at a minimum, reactor shutdown and, possibly, reactor core damage. Due to the criticality of continued coolant supply, it is now a regulatory requirement that at least the rotational speeds of the coolant pump shafts be continuously monitored.

The problem of nuclear shaft monitoring system pump is made vastly more complex by radioactivity which degrades the performance of any electronic equipment emplaced in the pump area. At the present time, such monitoring is performed by a magnetic reluctance device which detects and counts the passage, through a detection gap, of the teeth of a metallic gear mounted on the pump shaft. Devices of this type suffer, however, in that they require frequent recalibration which must be performed with the pump in operation. Unfortunately, due to the radioactivity present during reactor operation, such recalibration can only be performed during system outages.

Further, given the severe consequences of coolant pump failure, it would be advantageous to have the ability to predict shaft failure sufficiently in advance to permit repair or replacement during a regularly scheduled system outage. Since shaft failure is almost invariably preceded by increased shaft wobble or lateral position variation, the ability to monitor the magnitude of such wobble and detect increases therein would provide a basis for such failure prediction.

It is, therefore, an object of the present invention to provide an apparatus for monitoring the rotational speed of the shaft of a coolant circulating pump in a nuclear steam generating system, which also monitors shaft wobble.

It is yet another object of the invention to provide such an apparatus which is accurate, reliable and immune to radiation damage.

The foregoing and other objects and advantages of the invention as may hereinafter appear are achieved, in general, by an apparatus comprising a light source for sequentially directing a single light beam at at least one, but preferably a plurality, of light reflecting surfaces formed on the shaft and light receiving means for sequentially receiving a pair of spaced apart light beams reflected off the reflective surfaces. The intensity of the two light beams of the pair is measured, on a time-dependent basis, by an intensity measuring means connected to the light receiving means by fiber optic cable. A processor calculates the shaft rotational speed and the magnitude of the shaft wobble or lateral position variation from a nominal lateral position as functions of the time-dependent measurements of the pair of reflected light beams.

More specifically, the light receiving means and the intensity measuring means are so positioned and adjusted that the pair of light beams are of equal indicated intensity when the shaft is in its nominal lateral position.

Advantageously, the reflective surfaces are defined by at least one but preferably a plurality, of axially extending non-reflective stripes formed on the polished shaft surface. Also advantageously, the light receiving means and the intensity measuring means are connected by fiber optic cables.

DESCRIPTION OF THE PREFERRED EMBODIMENT

Figure 1:
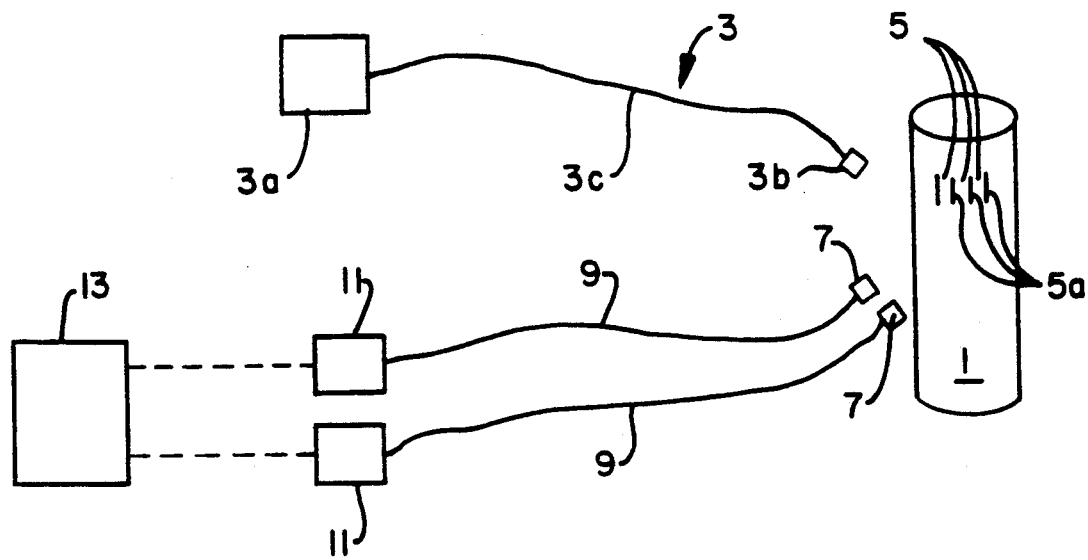
FIG. 1 is a schematic representation of a nuclear system pump shaft monitoring apparatus in accord with the present invention.

Turning now to the drawings, and in particular to FIG. 1, there is shown, in schematic form, an apparatus for monitoring the lateral position of the shaft 1 of a coolant circulating pump, which apparatus includes a light source 3 for directing a light beam at a number of reflecting surfaces 5 on shaft 1 and a pair of spaced apart light receiving devices 7 adapted to receive light beams reflected off reflecting surfaces 5. Light from receiving devices 7 is conveyed, by fiber optic cables 9 to photo sensors 11, which measure, on a time dependent basis, the intensity of the light beams received by receiving devices 7. The use of fiber optic cables 9 allows the electronic devices at a point remote from the pump, shielded from damaging radiation. A processor 13, operatively connected to photo sensors 11, calculates the shaft rotational speed and the magnitude of the shaft wobble or lateral position variation as functions of the time-dependent intensity measurements of the pair of reflected light beams.

Reflecting surfaces 5 are advantageously defined on the polished surface of shaft 1 by a plurality of axially extending non-reflective stripes 5a formed by painting or chemical etching. However, other means of providing alternating reflective and non-reflective areas about the shaft circumference may be employed.

Light source 3 comprises a light emitting diode (LED) or laser 3a coupled to a collimating lens 3b by a fiber optic cable 3c. The output of collimating lens 3b is a spot of light, less than 3 mm in diameter, impinging about the middle of reflective surfaces 5, at an oblique angle to the shaft axis.

Light receiving devices 7 and photo sensors 11 are so positioned and adjusted that the indicated intensity of the pair of reflected light beams is equal when shaft 1 is in its nominal position. Thus, receiving devices 7 are so positioned, relative to light source 3 and shaft 1, that they receive reflected light beams of substantially equal intensity. Simultaneously or for purposes of system calibration, the sensitivities of photo sensors 11 may be adjusted so that their output is equal when there is no shaft wobble.

Figures 2A, 2B, 2C:
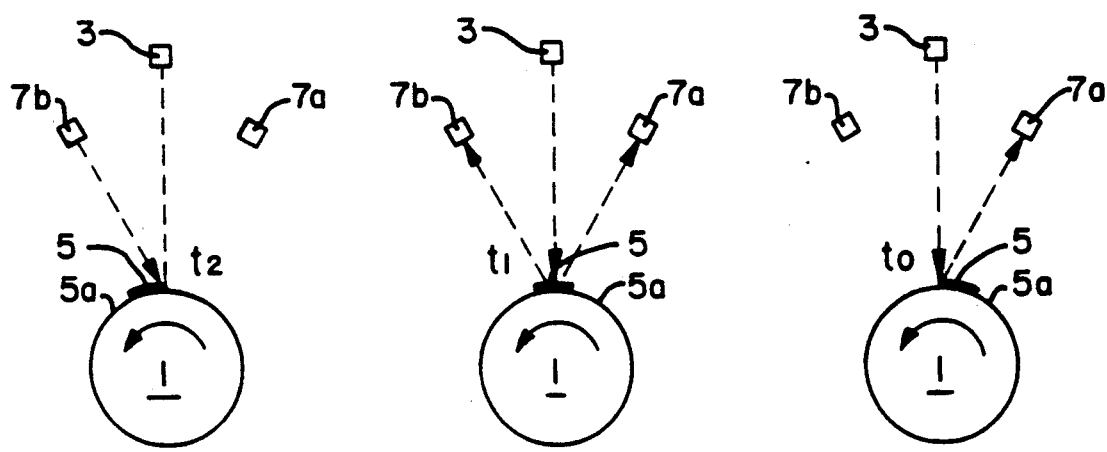
FIGS. 2a–c are a sequential series of diagrams illustrating reflection of light off a rotating shaft.
Figure 3:
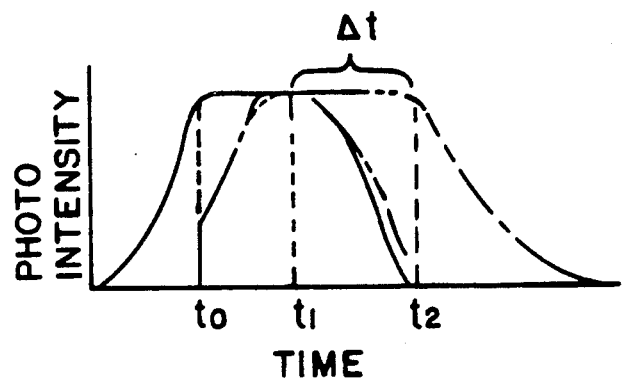
FIG. 3 is a graphic presentation of representative light intensity data from a rotating shaft.
Figures 4A, 4B, 4C:
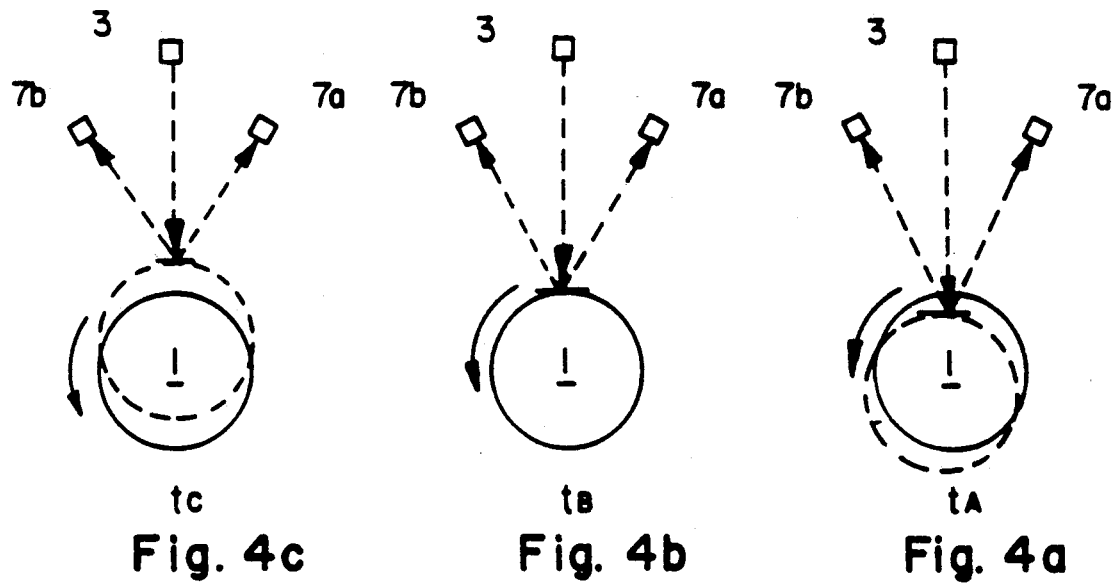
FIGS. 4a–c are a sequential series of diagrams illustrating reflection of light off a wobbling shaft.
Figure 5:
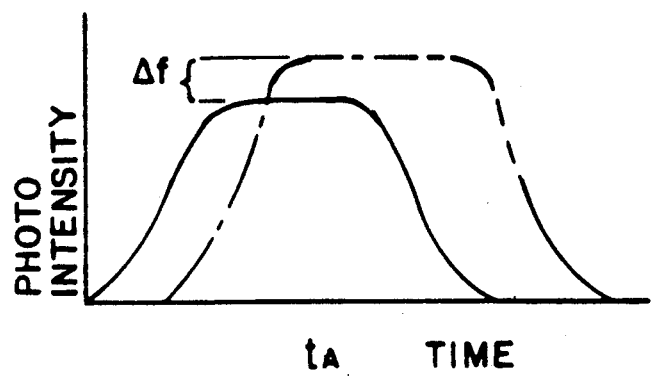
FIG. 5 is a graphic presentation of representative light intensity data from a wobbling shaft.

In FIGS. 2a–c, there is illustrated, in simplified form, the effect of shaft rotation on light reflection. Thus, in FIG. 2a, light from light source 3 is reflected off reflecting surface 5 and is received by receiving device 7a, but not by receiving device 7b. In FIG. 2b, shaft 1 has rotated, in the direction indicated by the arrow, such that light from light source 3 is equally reflected to receiving devices 7a and 7b. As shaft 1 continues to rotate, as seen in FIG. 2c, light is reflected to receiving device 7b, but not receiving device 7a. The intensities of the light beams received by receiving devices 7a, 7b are plotted, on a time dependent basis, in FIG. 3. If the shaft is perfectly aligned, i.e., there is no wobble, the time-dependent intensity curves of both receiving devices will exhibit equal duration and equal peak levels, while the time delay (Δt) between the two curves is indicative of the shaft rotational speed.

Figure 6:
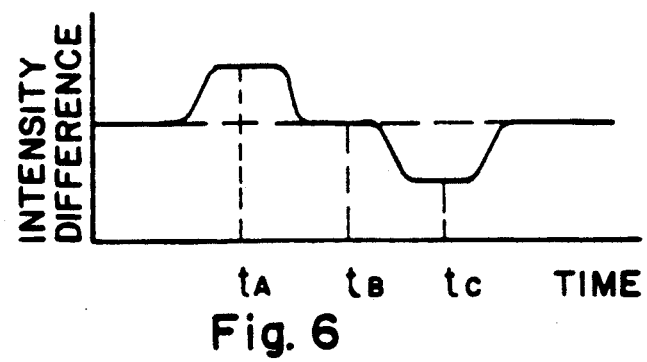
FIG. 6 is a graphic presentation of representative light intensity difference data from a wobbling shaft.

FIGS. 4a–c and FIG. 5 illustrate the effect, on light reflection, of wobble of the rotating shaft. Thus, it is to be noted that, if the shaft is wobbling, there is a difference (Δf) in the peak levels of the time-dependent intensity curves. This difference is plotted, on a time-dependent basis, in FIG. 6. The characteristics of the wobble can be determined by the difference pattern as shown in FIG. 6.

Although the invention has been described with reference to a specific embodiment thereof, it is to be understood that various changes and modifications may be made thereto without departing from the spirit and contemplation of the invention, which is intended to be limited in scope only by the appended claims.

I claim:

1. An apparatus for monitoring the speed and lateral position variation from the nominal lateral position of the shaft of a reactor coolant circulating pump of a nuclear steam generating system, the apparatus comprising:
    at least one reflective surface defined by at least one non-reflective surface portion on the pump shaft;
    light source means for directing a light beam onto said reflective surface;
    light receiving means for receiving each of a pair of spaced apart reflected light beams reflected from said reflective surface;
    intensity measuring means for measuring, on a time-dependent basis, the intensity of each one of said pair of reflected light beams received by said light receiving means;
    said light receiving means and said intensity measuring means being connected by fiber optic cable; and
    processing means for calculating both the shaft speed and lateral position variation as a function of the time-dependent intensity measurements of each one of said pair of light beams.

2. The apparatus of claim 1, wherein said light receiving means and said intensity measuring means are so positioned and adjusted that the indicated intensity of each of said pair of light beams is equal when the shaft is in its nominal lateral position.

* * * * *